US010869224B2

(12) United States Patent
Zhao et al.

(10) Patent No.: US 10,869,224 B2
(45) Date of Patent: Dec. 15, 2020

(54) FAST SYNCHRONIZATION OF COMPRESSOR STATE AND DECOMPRESSION STATE IN MARGINAL WIRELESS COVERAGE

(71) Applicant: Apple Inc., Cupertino, CA (US)

(72) Inventors: Yingjie Zhao, Pleasanton, CA (US); Lele Cui, Beijing (CN); Faraz Faheem, Santa Clara, CA (US); Li Su, San Jose, CA (US); Jianxiong Shi, Dublin, CA (US); Xu Ou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 16/461,879

(22) PCT Filed: May 18, 2018

(86) PCT No.: PCT/CN2018/087530
§ 371 (c)(1),
(2) Date: May 17, 2019

(87) PCT Pub. No.: WO2019/218354
PCT Pub. Date: Nov. 21, 2019

(65) Prior Publication Data
US 2020/0275311 A1    Aug. 27, 2020

(51) Int. Cl.
*H04W 28/06* (2009.01)
*H04W 28/02* (2009.01)
*H04L 12/823* (2013.01)

(52) U.S. Cl.
CPC ........... *H04W 28/06* (2013.01); *H04L 47/323* (2013.01); *H04W 28/0252* (2013.01)

(58) Field of Classification Search
CPC .. H04W 28/06; H04W 28/0252; H04L 47/323
See application file for complete search history.

(56) References Cited

U.S. PATENT DOCUMENTS

2006/0262757 A1   11/2006   Baek
2007/0025264 A1*   2/2007   Cheng ................. H04L 47/2416
                                                                370/252

(Continued)

FOREIGN PATENT DOCUMENTS

CN           1643881 A      7/2005
CN         105052217 A     11/2015

*Primary Examiner* — Afshawn M Towfighi
(74) *Attorney, Agent, or Firm* — Kowert, Hood, Munyon, Rankin & Goetzel, P.C.

(57) ABSTRACT

A compressor may obtain information indicative of a transmit delay representative of a time duration that elapses between creation (e.g. by the compressor) of a packet and the transmission of the packet, e.g. over a wireless link. The transmit delay may be determined based at least on information indicative of the uplink capacity of the cellular network. The uplink capacity may be determined/obtained based on the uplink throughput and uplink power headroom. When the compressor receives a negative acknowledgement transmission/packet from the decompressor, if the transmit delay is not greater than a specified threshold value, the compressor may process the received negative acknowledgement packet. If the transmit delay is greater than the specified threshold value, the compressor may first discard the buffered compressed packet scheduled to be transmitted next to the decompressor, and transmit an initialization and refresh (IR) or IR dynamic packet to the decompressor instead.

20 Claims, 5 Drawing Sheets

(56) References Cited

U.S. PATENT DOCUMENTS

| | | | |
|---|---|---|---|
| 2008/0020775 A1* | 1/2008 | Willars | H04L 47/2441 455/445 |
| 2013/0244597 A1 | 9/2013 | Kawamoto | |

* cited by examiner

FAST SYNCHRONIZATION OF COMPRESSOR STATE AND DECOMPRESSION STATE IN MARGINAL WIRELESS COVERAGE

FIELD OF THE INVENTION

The present application relates to wireless communications, and more particularly to compression-state (e.g. ROHC-state) synchronization during wireless communications.

DESCRIPTION OF THE RELATED ART

Wireless communication systems are rapidly growing in usage. In recent years, wireless devices such as smart phones and tablet computers hare become increasingly sophisticated. In addition to supporting telephone calls, many mobile devices now provide access to the internet, email, text messaging, and navigation using the global positioning system (GPS), and are capable of operating sophisticated applications that these functionalities.

Long Term Evolution (LTE) has become the technology of choice for the majority of wireless network operators worldwide, providing mobile broadband data and high-speed Internet access to their subscriber base. A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply refereed to as NR). 5G-NR proposes a higher capacity for a higher density of mobile broadband users, also supporting device-to-device, ultra-reliable, and massive machine communications, as well as lower latency and lower battery consumption, than current LTE standards. Additionally there exist numerous other different wireless communication technologies and standards Some examples of wireless communication standards in addition to those mentioned above include GSM, UMTS (WCDMA, TDS-CDMA), LTE Advanced (LTE-A), HSPA, 3GPP2 CDMA2000 (e.g. 1xRTT, 1xEV-DO, HRPD, eHRPD), IEEE 802.11 (WLAN or Wi-Fi), IEEE 802.16 (WMAX), BLUETOOTH™, etc.

Various wireless communications standards, such as LTE and NR, utilize packet switched networks. During certain types of communications (for example communications associated with streaming applications such as real-time voice calls, video streaming, audio streaming, etc.) between wireless mobile device user terminals (UE devices) and wireless networks (base stations, e.g. eNBs), the overhead for various different types of packets (e.g. IP, UDP, and/or RTP) represents a substantial amount (or percentage) of the total amount of transmitted data. Such large overheads may be tolerable in local wired links where capacity is often not an issue, but are deemed excessive for wireless communications where bandwidth is at a premium. Therefore, wireless communication protocols (e.g. LTE and/or NR) often make use of packet header compression in order to improve bandwidth usage. One compression protocol often used in packet switched wireless communications is the Robust Header Compression (ROHC) protocol, which provides an efficient, flexible, and future-proof header compression concept designed to operate efficiently and robustly over various link technologies with different characteristics.

One important feature of ROHC is the interaction between a compressor state machine (the compressor, for short) and a decompressor state machine (the decompressor, for short). The compressor transmits the information needed to successfully decompress the packet based on its confidence of the state of the decompressor context. The compressor is expected to ensure that the decompressor operates in a state that allows for the decompression of the most efficient ROHC compressed (CO) packet. A compressor can therefore receive feedback from decompressor on a feedback channel, and the use of such a feedback channel is highly recommended in a cellular environment to improve communication performance. The decompressor can use the feedback channel to provide positive acknowledgments (ACKs) or negative acknowledgments (NACKs) to the compressor. The feedback is typically provided per context. Once the feedback channel has been established for a context, the compressor uses the feedback to estimate the decompression state of the decompressor. The feedback information therefore drives the compressor to quickly achieve the necessary confidence level with respect to the accuracy and efficiency of the compression/decompression.

In cellular networks, especially under adverse radio frequency (signal) conditions, the packet transmit delay (the time delay from the creation of a packet to the transmission of the packet, e.g. transmission of the packet over a wireless link) is oftentimes longer than the maximum delay still allowing for accurate synchronization of the compressor state and the decompressor state. Under adverse radio frequency conditions, packet transmissions from the transmitting device (e.g. from a mobile device) may encounter a transmit limit issue, making it difficult to synchronize the respective sum of the compressor and decompressor. For example, upon receiving a NACK from the decompressor, even in response to the compressor having transmitted an IR/IR-DYN (Initialization and Refresh/Initialization and Refresh Dynamic) packet, due to the physical layer bandwidth limitation and the next transmit packet being a previously (earlier) buffered compressed packet, the decompressor may keep receiving the previously buffered CO packet when expecting an IR/RR-DYN packet. At that stage the decompressor cannot properly decompress packets other than IR/IR-DYN packets, and will therefore keep transmitting a MACK back to the compressor.

Other cone speeding issues related to the prior art will become apparent to one skilled in the art after comparing such prior art with the disclosed embodiments as described herein.

SUMMARY OF THE INVENTION

Embodiments are presented herein of, inter alia, methods for accurate compression state synchronization between compressor state and decompressor state during wireless communications, e.g. on packet data networks, where packet header compression is applied dining such communications, and of devices that implement the methods. Embodiments are further presented herein for accurate compressor state and decompressor state synchronization when applying header compression for uplink communications in wireless communication systems containing user equipment (UE) devices and base stations communicating with each other within the wireless communication systems.

In various embodiments, devices may include a compressor and a decompressor to implement packet compression, e.g. Robust Overhead Compression (ROHC), for compressing at least a portion of the packets transmitted by the devices. During communications, e.g. wireless communications, the transmitting device may also receive feedback messages (e.g. feedback packets) from a decompressor operating in the receiving device that receives the (at least partially) compressed packets from the transmitting device. The feedback messages are used by the transmitting device to determine/obtain information indicative of the state of the decompressor in the receiving deuce with respect to the state of the compressor in the transmitting device. The transmitting device may operate its compressor such that the state of the compressor in the transmitting device is accurately synchronized with the state of the decompressor in the receiving device.

Accordingly, the compressor may obtain information indicative of a transmit delay representative of a time duration that elapses between the creation (e.g. by the compression engine compressor) of a packet and the transmission of the packet, e.g. over a wireless link. In some embodiments, the compressor may determine obtain the transmit delay at least partially based on information indicative of the uplink capacity of the cellular network, which itself may be determined/obtained based at least on the uplink throughput and uplink power headroom. When the compressor receives a NACK transmission/packet from the decompressor, if the transmit delay is not greater than a specified threshold value, the compressor may process the received NACK packet. If the transmit delay is greater than the specified threshold value, the compressor may also discard the buffered compressed (CO) packet, and transmit an IR/IR-DYN packet to the decompressor.

The synchronization algorithm described above may also be adapted to certain specific scenarios to also take into consideration UL and DL performance. Thus, in some embodiments, e.g. when the upper layer (of the protocol stack) includes TCP as a transport layer protocol, and the traffic mode features DL TCP data transmissions while most UL packets are TCP ACK packets, the UE (e.g. the compressor in the UE) may operate to establish a balance between UL performance and DL performance. Accordingly, the compressor (for this scenario, in the UE) may obtain information indicative of the available UL bandwidth, information indicative of the transmit delay representative of a time duration that elapses between creation (e.g. by the compression engine/compressor) of a packet and transmission of the packet over a wireless link, and/or information indicative of whether an amount of dab that the decompressor (for this scenario, in the server/base station) may receive is increasing (e.g. the TCP congestion window is "ramping up"). The compressor may obtain the information pertaining to the congestion window based on one or more indicators, e.g. based at least on the TCP session start time and/or DL throughput, etc. In response to determining that the amount of data the decompressor may receive is increasing (e.g. the TCP congestion window at the server/base station side is "ramping up"), the compressor may proceed with the compression and transmission of the available TCP ACK packets. In response to determining that the amount of data the decompressor may receive is not increasing, the compressor may check the transmit delay, and if the transmit delay is not greater than the specified threshold value, the compressor may process NACK packet(s) received from the decompressor. If the transmit delay is greater than the threshold value, the compressor may discard at least some of the compressed TCP ACK packets already in the transmit buffer (of the UE), and may proceed with transmission of the nest (non-discarded) TCP ACK packet(s) to the decompressor.

Note that the techniques described herein may be implemented in and/or used with a number of different types of devices, including but not limited to, base stations, access points, cellular phones, portable media players, tablet computes, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
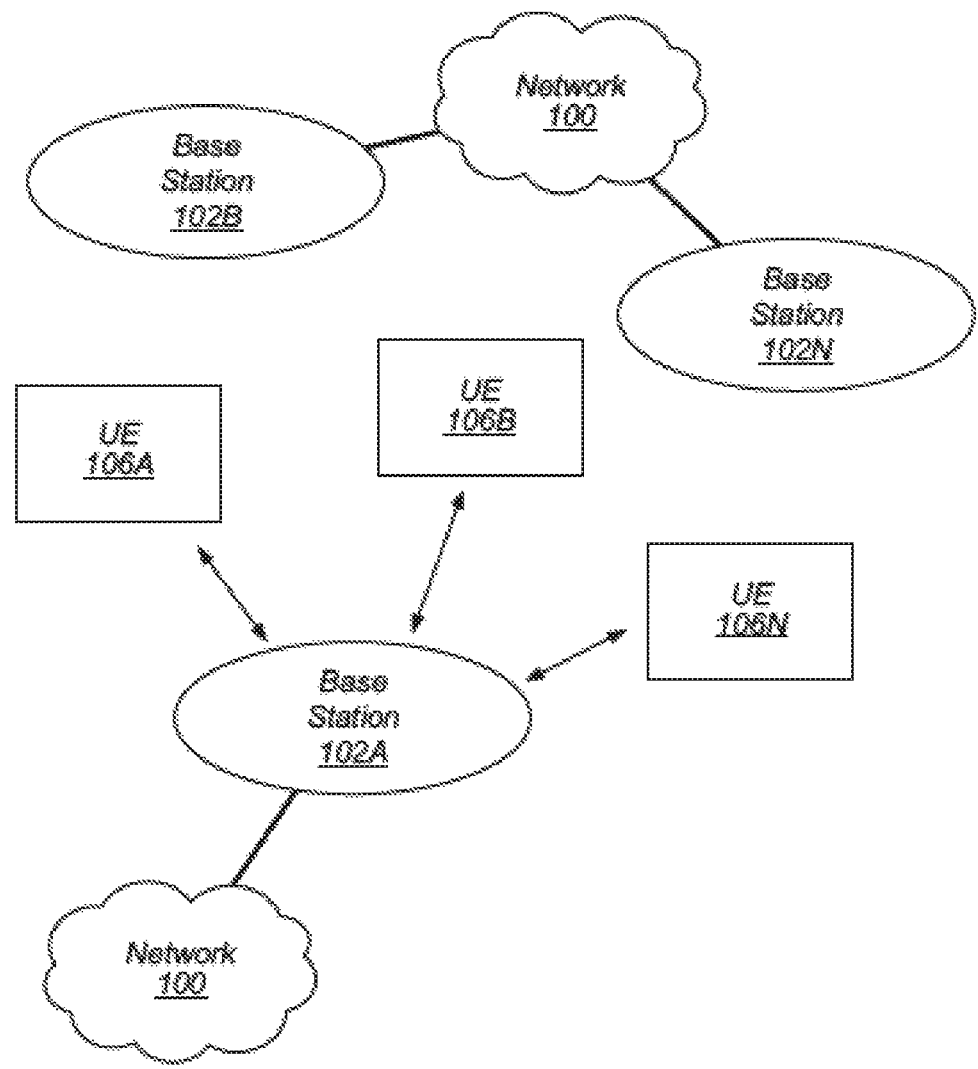
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

ACK: Acknowledge(ment)
AP: Access Point
BS: Base Station
BSR: Buffer Size Report
CO: Compressed
CPU: Central Processing Unit
DL: Downlink (from BS to UE)
DYN: Dynamic
ESR: Extended Service Request
FDD: Frequency Division Duplexing
FT: Frame Type FTP: File Transfer Protocol
GPRS: General Packet Radio Service
GSM: Global System for Mobile Communication
IP: Internet Protocol
IR: Initialization and Refresh
IR-DYN: Initialization and Refresh Dynamic
LAN: Local Area Network
LTE: Long Term Evolution
MAC: Media Access Control
NACK: Negative Acknowledge(ment)
NAS: Non-Access Stratum
PDCP: Packet Data Convergence Protocol
PDN: Packet Data Network
PDU: Protocol Data Unit
PT: Payload Type
RAT: Radio Access Technology
RF: Radio Frequency
ROHC: Robust Header Compression
RRC: Radio Resource Control
RTP: Real-time Transport Protocol
RX: Reception/Receive
TCP: Transmission Control Protocol
TDD: Time Division Duplexing
TX: Transmission/Transmit
USP: User Datagram Protocol
User Equipment
UL: Uplink (from UE to BS)
UMTS: Universal Mobile Telecommunication System
VoLTE: Voice Over LTE
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable. UE devices that perform wireless communications are also referred to as wireless communication devices. Examples of UE devices include mobile telephones or smart phones (e.g., iPhone™, Android™-based phones) and tablet computers such as iPad™, Samsung Galaxy™, etc., portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of deuces) which is easily transported by a user.

Base Station (BS)—The term "Base Station" has the full breadth of its ordinary meaning and at least includes a wireless communication station installed at a fixed location and used to communicate as part of a wireless telephone system or radio system.

Processing Element—refers to various elements or combinations of elements that are capable of perforating a function in a device, e.g. in a user equipment device or in a cellular network device. Processing elements may include, for example: processes and associated memory, portions or circuits of individual processor cores, entire processor cores, processor arrays, various analog and/or digital circuitry, circuits such as an ASIC (Application Specific Integrated Circuit), programmable hardware elements such as a field programmable gate array (FPGA), as well as any of various combinations of the above.

Wireless Device (or Wireless Communication Device)—any of various types of computer systems devices which performs wireless communications using WLAN communications, SRAT communications, cellular communications, Wi-Fi communications and the like. As used herein, the term "wireless device" or "wireless communication device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet Most modem Wi-Fi networks (or WLAN networks) are based on IEEE 802.11 standards and are marketed under the "Wi-Fi". A Wi-Fi (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a sheet range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user where the user provides input to directly perform the operation. An automatic procedure may be initiated by input provided by the user, but the subsequent actions that are performed "automatically" are not specified by the user, i.e., are not performed "manually", where the user specifies each action to perform. For example, a user out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refer, to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or during operation. As such, the component can be configured to perform the task even when the component is not currently on. In general, the circuitry that forms the structure corresponding to "configured to" may include hardware circuits.

Various components may be described as performing a task or tasks, for convenience in foe description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
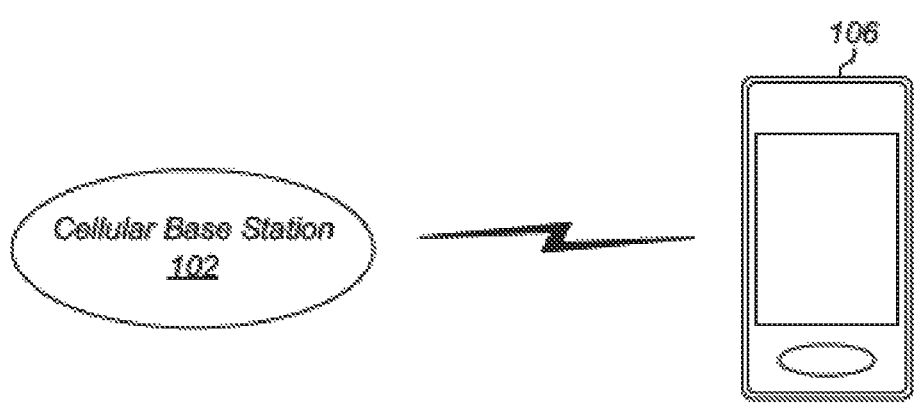
FIG. 2 illustrates an exemplary base station in communication with an exemplary wireless user equipment (UE) device, according to some embodiments.

FIGS. 1 and 2—Exemplary Communication Systems

FIG. 1 illustrates an exemplars (and simplified) wireless communication system, according to some embodiments. It is noted dial the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet among various possibilities). Thus, the base station 102 may facilitate communication between the user devices and/or between the user devices and foe network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network. It should also be noted that "cell" may also refer to a logical identity for a given coverage area at a given frequency. In general, any independent cellular wireless coverage area may be referred to as a "cell". In such cases a base station may be situated at particular confluence of three cells. The base station, in this uniform topology, may serve three 120-degree beam-width areas referenced as cells. Also, in case of carrier aggregation, small cells, relays, etc may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads).

The base station 102 and the user devices may be configured to communicate over the transmission medium using any of various radio access technologies (RATs), also referred to as wireless communication technologies, or telecommunication standards, such as GSM, UMTS (WCDMA), 5G-NR (New Radio, or NR for short), LTE, LTE-Advanced (LTE-A), 3GPP2 CDMA2000 (e.g., 1×RTT, 1×EV-DO, HRPD, eHRPD), Wi-Fi, WiMAX etc. In some embodiments the base station 102 communicates with at least one UE with accurate synchronization between compressor state and decompressor state as described herein, preferably through LTE, NR, or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards), and/or other cellular communication standard (e.g. NR). In some embodiments, the UE 106 may be configured to communicate with base station 102 using dynamic header compression (e.g. ROHC), for example for uplink communications, with accurate synchronization between compressor and decompressor state as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. In some embodiments, the UE 106 may include any processing element(s) that perform any of the method embodiments described herein. For example, the UE 106 may include any one or more of a processor, FPGA, custom circuitry application specific integrated circuit and/or system on a chip interoperating to execute perform any of the method embodiments described herein. The UE 106 may be configured to communicate using any of multiple wireless communication protocols. For example, the UE 106 may be configured to communicate using two or more of CDMA2000, LTE, LTE-A, 5G-NR (NR), or GNSS. Other combinations of wireless communication standards are also possible.

The UE 106 may include one or more antennas for communicating using the one or more wireless communication protocols mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e g including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and BLUETOOTH™. Other configurations are also possible.

Figure 3:
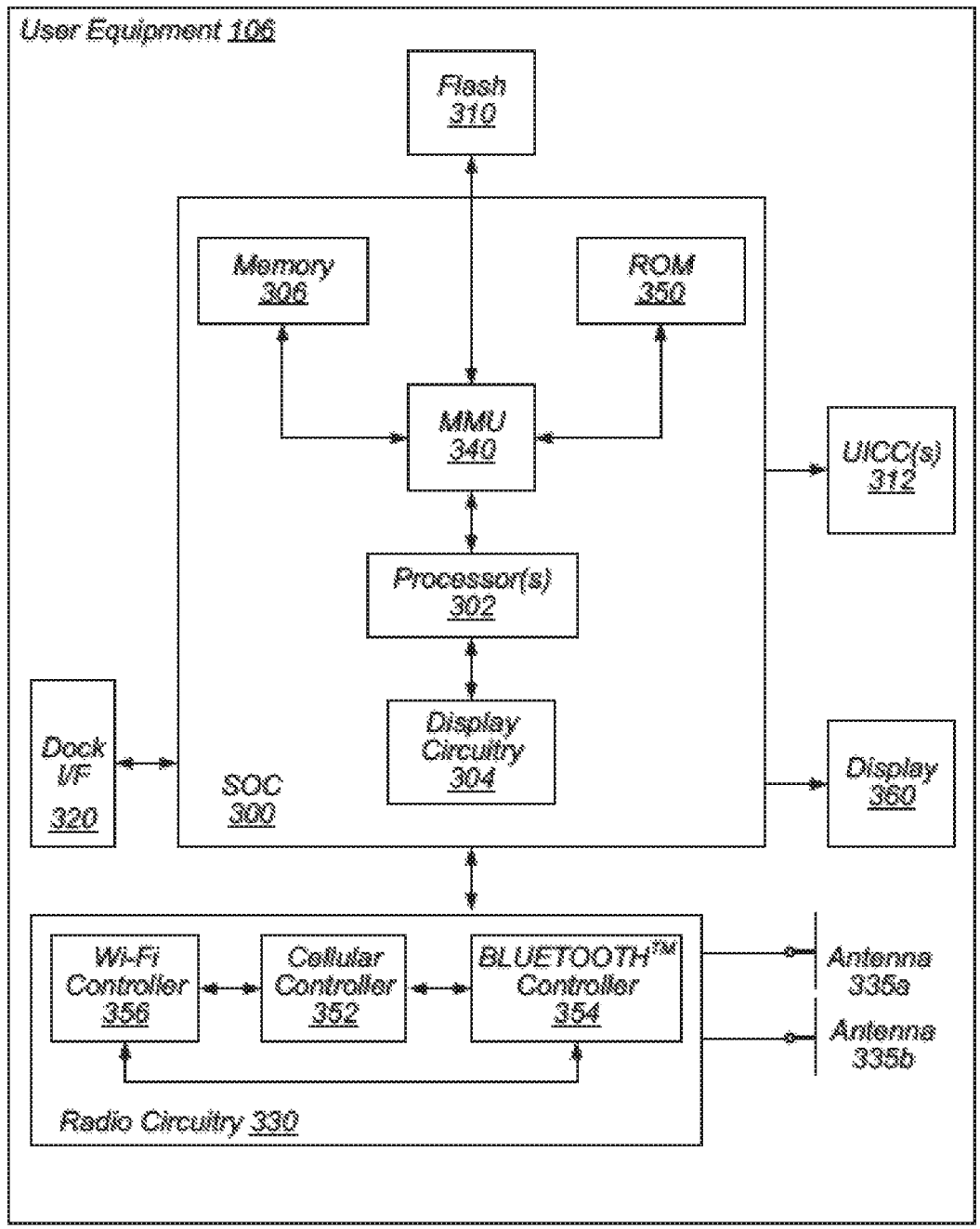
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coup Led to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio (circuitry) 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system) the display 360, and wireless communication circuitry (or radio circuitry) 330 (e.g., for LTE, LTE-A, 5G-NR, CDMA2000, BLUETOOTH™, Wi-Fi, GPS, etc.). The UE device 106 may include at least one antenna (e.g. 335a), and possibly multiple antennas (e.g. illustrated as antennas 335a and 335b), for performing wireless communication with base stations and/or other devices. Antennas 335a and 335b are shown by way of example, and UE device 106 may include fewer or more antennas. Overall, the one or more antennas (including 335a and 335b) are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for applying dynamic header compression (e.g. ROHC) with accurate synchronization between compressor state and decompressor state, for example for wireless uplink communications, which may, among other benefits, reduce power consumption and thereby improve the uplink link-budget of UE 106. The processor(s) 302 of the UE device 106 may be configured to implement part or all of the methods described herein—e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporates header compression with accurate synchronization between compressor state and decompressor state according to various embodiments disclosed herein. Specifically, processor(s) 302 may be coupled to and/or may interoperate with other components as shown in FIG. 3 to facilitate UE 106 performing header compression with accurate synchronization between compressor state and decompressor state. Processor(s) 302 may also implement various other applications and/or end-user applications muting on UE 106.

In some embodiments, radio (circuitry) 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, mirror BLUETOOTH™ controller 354 may communicate with cellular controller 352 over a cell-ISM link, etc. While three separate controllers are illustrated within radio circuitry 330, other embodiments may have fewer or more similar controllers for various different RATS that may be implemented in UE device 106, and radio circuitry 330 may be implemented as any number of different controllers, for facilitating wireless communications according to various respective wireless standards, for example as shown in FIG. 3, or in a single controller, or any combination as desired.

Figure 4:
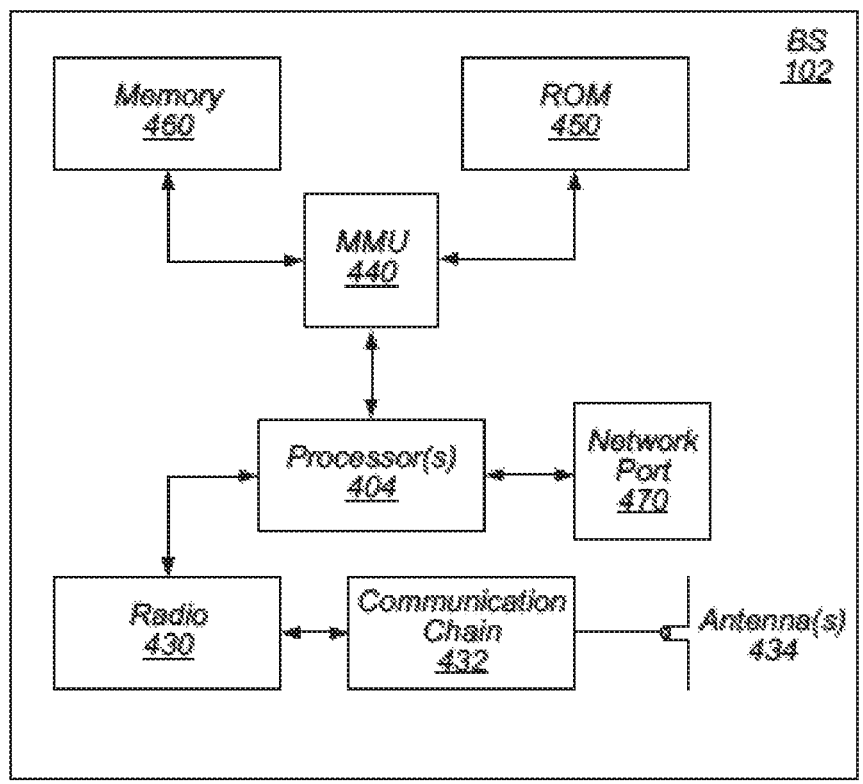
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) at to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular se ice provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna, and possibly multiple antennas. The one or more antennas are collectively referred to as antenna(s) 434. Antenna(s) 434 may be configured to operate as a wireless transceiver and may be further configured to communicate with UE devices 106 via radio 430. The antenna(s) 434 communicate with the radio 430 via communication chain 432. Communication chain 432 may be a receive chain, a transmit chain or both. The radio (circuitry) 430 may be designed to communicate via various wireless telecommunication standards, including, but not limited to, LTE, LTE-A, 5G-NR, WCDMA, CDMA2000, etc. The processor(s) 404 of the base station 102 may be configured to implement part or all of the methods described herein for base station 102 to perform header compression (e.g. ROHC) with accurate synchronization between compressor state and decompressor state, e.g., by executing program instructions stored on a memory medium (e.g., a non-transitory computer-readable memory medium). Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g. it may include at least one Ethernet port, and radio 430 may be designed to communicate according to the Wi-Fi standard. Base station 102 may operate according to the various methods as disclosed herein for accurate synchronization of the compression state with the decompression state.

Header Compression and Robust Overhead Compression (ROHC)

Figure 5:
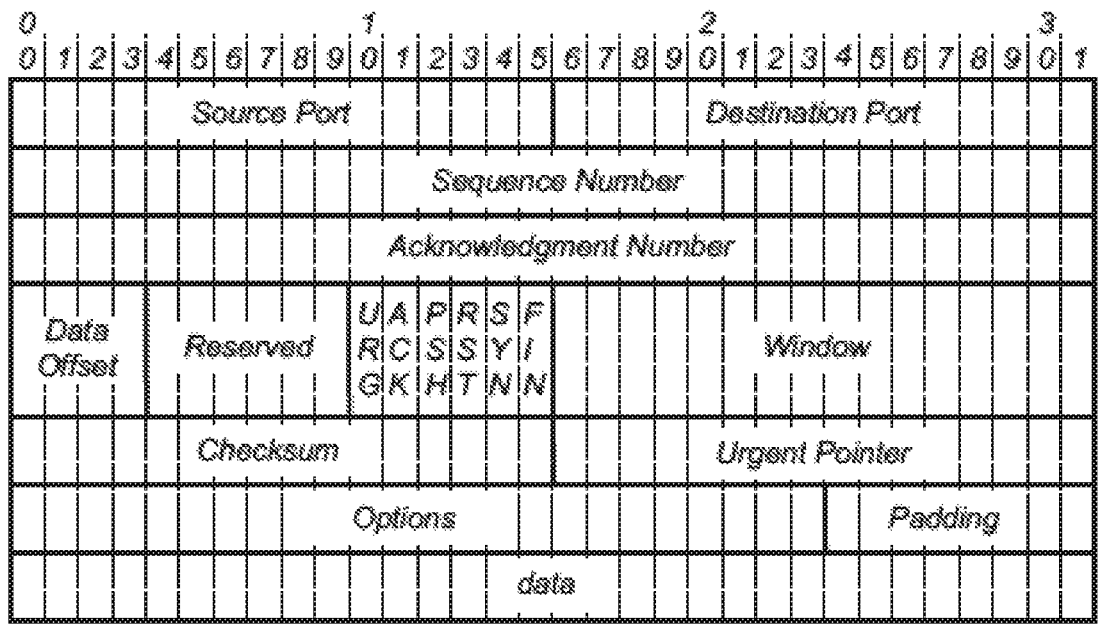
FIG. 5 shows a diagram illustrating a Transmission Control Protocol (TCP) packet format according to Internet Engineering Task Force Request for Comment (IETF RFC) 793.

As previously mentioned compression may be used on the packet headers in order to more efficiently transmit packets where the header represents at least a certain percentage of the total packet size. FIG. 5 shows a diagram illustrating the packet format for a Transmission Control Protocol (TCP) packet according to Internet Engineering Task Force Request for Comments (IETF RFC) 793. One compression standard for header compression is ROHC (Robust Header Compression), which is used to compress overhead bytes in a packet into typically one or three bytes by placing a compressor before a given link having limited capacity, and placing a decompressor after the given link. The compressor convert the large overhead to a few bytes, while the decompressor performs the corresponding inverse operation. The ROHC compression scheme generally performs well over links where the packet loss rate is high, such as wireless links. ROHC has three modes of operation; a unidirectional mode (U-mode), a bidirectional optimistic mode (O-mode), and a bidirectional reliable mode (R-mode). ROHC may use various different packet types. For example, ROHC-TCP uses three different packet types: the Initialization and Refresh (IR) packet type, the Context Replication (IR-CR) packet type, and the Compressed (CO) packet type. The IR packet type communicates the static part of the context (IR) the dynamic part of the context (IR-DYN). The IC-CR packet type communicates a reference to a base context along with the static and dynamic parts of the replicated context that differ, from the base context. The CO packets communicate irregularities in the packet header, may carry a CRC, and may also update the context.

As previously described, ROHC prominently features an interaction between the compressor state machine and the decompressor state machine, whereby the compressor transmits, to the decompressor, information needed to successfully decompress the packet, based on the compressor's confidence of the state of the decompressor context. The compressor is expected to ensure that the decompressor operates in a state that allows for the decompression of the most efficient compressed packet. A compressor therefore receives feedback from decompressor on a feedback channel. It should be noted that ROHC is used primarily as an exemplary compression scheme with feedback from decompressor to compressor, and various embodiment of system and methods of accurate synchronization between compressor state and decompressor state disclosed herein may be equally applicable to other compression schemes where such synchronization may be utilized.

Three different types of feedback hare been specified for ROHC. Acknowledgment (ACK), negative acknowledgment (NACK), and static negative acknowledgment (STATIC-NACK). The compressor may use acknowledgment feedback (ACKs) to move to a higher compression state. Reception of an ACK indicates to the compressor that the decompressor has updated the context with the information from the compressor, and can correctly decompress the packet. In response to receiving a NACK, the compressor moves to a lower compression state. Reception of a NACK indicates to the compressor that only the static part of the decompressor is valid, and the compressor needs to retransmit all dynamic information, via an Initialization and Refresh (IR) packet or an IR dynamic (IR-DYN) packet. Reception of a static-NACK indicates to the compressor that the decompressor has no valid context, and the compressor retransmits all static all dynamic information via an IR packet.

The decompressor may have three states. A no context (NC) state, a static context (SC) state, and a full context (FC) state. The decompressor starts with the NC state, with successful decompression moving the decompressor to the FC state. Repeated decompression failures force the decompressor to transit downwards to a lower state, otherwise its state machine remains in the FC state. In the NC state, only IR packets can be decompressed and the decompressor is expected to transmit a STATIC-NACK to the compressor if a packet of a type other than IR is received or if decompression of an IR packet has failed. Once a packet has been validated and decompressed correctly, the decompressor may transit to the FC state. In the SC state, the decompressor can only decompress IR and IR-DYN packets, or special compressed (CO) packets. The decompressor is expected to transmit a STATIC-NACK to the compressor if decompression of an IR or IR-DYN packet fails and SC damage is assumed. Upon receiving any other packet type, the decompressor is expected to transmit a NACK. In the FC state, the decompressor can decompress all types of packets. If context damage is detected, the decompressor moves back to the SC state and transmits a NACK to the compressor.

The context of a compressor is the state the compressor uses to compress a header. The context of the decompressor is the state the decompressor uses to decompress a header. Either of these two contexts or the two contexts in combination are typically referred to as "context", with a clear indication of which context is being referenced. To put it another way, the context is the state that the compressor and the decompressor maintain in order to correctly compress or decompress the headers of the packet in the flow. The context therefore contains relevant information from previous headers in the packet flow, such as static fields and possible reference values for compression and decompression. In other words, the context includes information associated with or corresponding to the compression/decompression engine for performing the compression/decompression. For example, the context may provide the necessary information to the decompressor for properly and accurately decompressing the compressed data. Moreover, additional information describing the packet flow may also be part of the context. For example, additional information may be associated with the change behavior of fields (e.g., the IP Identifier behavior, or the typical inter packet increase in sequence numbers and timestamps).

A compression context can be conceptually divided into two different parts, the static context and the dynamic context, each based on the properties of the fields that are being compressed. The static part may include the information necessary to compress and decompress the fields whose change behavior is classified as being static. The dynamic part may include the state maintained for all the other fields, e.g. those fields that are classified as changing.

Each context may be identified using a context identifier (CID). A context may be considered to be a new context when the CID is associated with a profile for the first time since the creation of the compression (e.g. ROHC) channel, or when the CID gets associated from the reception of an IR (this does not apply to the IR-DYN) with a different profile than the profile in the context. Context information is conceptually kept in a table. The context table is indexed using the CID, which is sent along with compressed headers and feedback information.

Accordingly, an IR packet contains a profile identifier, which determines how the rest of the header is to be interpreted and may also associate a profile with a context. Correspondingly, an IR-DYN packet communicates the dynamic part of the context. In contrast to the IR header, the IR-DYN header cannot initialize a non-initialized context, but it may redefine what profile is associated with a context if the profile indicated in the IR-DYN header allows such redefinition. The IR-DYN header may also or refresh (part of) a context.

Establishing Accurate Synchronization Between Compressor State and Decompressor State As previously mentioned, in cellular networks, under adverse RF/signal conditions, the packet transmit delay (the time duration from packet creation to packet transmission) may make it difficult for a mobile device to support accurate synchronization of the compressor state(s) and decompressor state(s). For example, in marginal coverage, on a TDD LTE network due to the LTE UL limit the UE may only transmit one compressed small packet in each UL subframe. The UE may enable header compression (e.g. ROHC) for the UL transmissions and may transmit compressed packets an UL. Consequently, the decompressor from the NW (e.g. base station, server) side may provide a NACK feedback if there is a decompression error. In TCP-based video, FTP or Web browsing applications, the UE may create one UL TCP ACK packet upon receiving 2-3 DL TCP packets. Due to this imbalanced UL/DL configuration, there may be 8-10 DL TCP packets in each transmit time interval, while at the same time the UE may only be transmitting two UL packets. This may result in the UE buffering compressed TCP ACK packets (or compressed C0 packets). When there is a UL transmit error, the decompressor may interpret it as a compression error and respond with a NACK feedback packet on DL. The UE would be expected to transmit an IR/IR-DYN packet in response to a NACK feedback packet, but due to the buffered compressed packets the NW (decompressor) may still receive and old compressed packet C0, not the IR/IR-DYN packet. The decompressor may interpret this as an error response and may even terminate the compressor context.

Generally, once the decompressor has moved into the SC state and has transmitted a NACK to the compressor, the decompressor is in a state where it can properly decompress IR and/or IR-DYN packets but no other types of packets. Consequently, if the decompressor receives other packet types (or other types of packets) when in the SC state, it will accordingly transmit a NACK back to the compressor. Upon receiving a NACK from the decompressor, even in response to the compressor having transmitted an IR/IR-DYN packet due to physical layer bandwidth limitations and a next transmit packet being a previously buffered compressed (CO) packet (as described in the above example), the decompressor may keep receiving the previously buffered CO packet while expecting an IR/IR-DYN packet. Consequently, the decompressor may not be able to properly decompress packets other than IR/IR-DYN packets and may therefore continue to transmit NACK messages to the compressor.

East Synchronization of Compressor State and Decompressor State

As mentioned above, when the decompressor is in the SC state, it can decompress IR/IR-DYN packets, but it may still receive compressed (CO) packets from the compressor due to the next transmit packet being a previously buffered CO packet. In such a case, the decompressor state and compressor state may remain out-of-sync (that is, they may remain unsynchronized or desynchronized), which may result in wasted resources and may even cause the compression context (e.g. ROHC context) to be terminated by the decompressor. In order to prevent the compressor state and decompressor state from becoming desynchronized in this manner, in some embodiments, a synchronization algorithm may be implemented to handle NACK transmissions from the decompressor, e.g. to handle the NACK transmissions from a decompressor in a cellular network.

Pursuant to the above, the compressor (e.g. in the transmitting device) may obtain information indicative of the transmit delay (TRDL) representative of a time duration that elapses between creation (e.g. by the compressor, such as an ROHC compressor) of a packet and the transmission of that packet over a wireless link. In some embodiments, the compressor may determine/obtain the TRDL at least partially based on information indicative of the uplink capacity (ULC) of the cellular network. The uplink capacity (ULC) may be determined/obtained based on the uplink throughput (ULTP) and uplink power headroom (ULPHR; may be expressed in dB). Accordingly, in some embodiment, the uplink capacity may be determined/obtained as follows:

$$ULC=ULTP*(1+\text{Maximum}(0,(\text{power}(10,ULPHR/10)-1))). \quad (1)$$

The transmit delay (TRDL) may be determined/obtained as follows:

$$TRDL=a*(UE \text{ Physical layer buffered packet})/ULC,$$
where "a" is a weighting factor. (2)

When the compressor receives a NACK transmission/packet from the decompressor, the compressor may check the transmit delay (TRDL), and if the TRDL is not over a specified threshold value (DELAY_UL), the compressor may simply process the received NACK. If the TRDL is over the specified threshold value, the compressor may first discard the buffered compressed (CO) packet process the received NACK, and transmit an IR/IR-DYN packet to the decompressor.

Compressor State and Decompressor State Synchronization while Balancing UL/DL Performance The synchronization algorithm described above may therefore be used to quickly synchronize the compressor state and decompressor state when bandwidth is limited (e.g. under adverse RF conditions, in LTE Coverage Enhancement (CE) mode, in small bandwidth LTE systems, etc.) Accordingly, the compressor may select to drop certain packets and reduce the buffer delay to avoid wasting resources and/or to avoid the termination of the compressor context the decompressor. However, under certain conditions such preventive measures by the compressor may adversely affect the DL transmission performance.

In some embodiments, if the upper laser (of the protocol stack) includes TCP as a transport layer protocol and the traffic mode features DL TCP data transmissions, most of the transmitted UL packets may be TCP ACK packets, and hence the buffered compressed packet(s) that the compressor may select to discard, to maintain accurate synchronization between the compressor stare and decompressor state as described above, may include TCP ACK packets. For example, the network (e.g. a base station server) may transmit a series (e.g. 1 through 6) of TCP packets. In response, the UE may queue up (e.g. in a transmit buffer) corresponding TCP ACK packets, e.g. TCP ACK2, TCP ACK4, and TCP ACK6 for transmission to the network (e.g. to base station/server) to acknowledge receipt of the six TCP packets. Based on the structure of TCP ACK packets. TCP ACK2 also indicates (acknowledges) receipt of TCP packet #1, TCP ACK4 indicates receipt of TCP packets #1 through #4, and TCP ACK6 indicates receipt of TCP packets #1 through #6. Thus, for example, the compressor may selectively discard the TCP ACK2 packet and/or the TCP ACK 4 packet in order to reduce the transmit delay of the TCP ACK6 packet, since TCP ACK6 packet would indicate receipt of TCP packets #1 through #6 However, this may affect the server-side congestion window, and may therefore affect the DL performance.

Accordingly, in some embodiments, the synchronization algorithm for the compressor may be adjusted to also maintain a given balance between UL performance and DL performance. This may be accomplished by the compressor obtaining information indicative of whether an amount of data that a decompressor (e.g. in a receiving device) has the capacity to receive is increasing (in other words, the data receiving capacity of the decompressor is increasing, e.g. the TCP congestion window in the above scenario is "ramping up"), in addition to obtaining information indicative of the available UL bandwidth on the cellular network and information indicative of the transmit delay representative of the time duration from the creation (e.g. by the compressor) of a packet to the transmission of the packet (as also described above). The compressor may obtain the information pertaining to the decompressor data receiving capacity (e.g. information pertaining to the congestion window in the above scenario) based on one or more protocol specific and/or network specific metrics, e.g. the TCP session start time, DL throughput, etc. for the above example.

In response to determining/identifying that the amount of data the decompressor has the capacity to receive is increasing (or obtaining an indication that the data the decompressor may receive has increased, e.g. the TCP congestion window at the server side is "ramping up"), the compressor may proceed with compressing and transmitting the UL packets (e.g. TCP ACK packets in the above example) without discarding any packets (which the compressor may otherwise possibly discard for the purpose of compression state synchronization as described above). In response to determining/identifying that the amount of data the decompressor has the capacity to receive is not increasing, the compressor may check the transmit delay (TRDL), and if the TRDL is not greater than the specified threshold (DELAY_UL), the compressor may process the NACK packet(s) received from the decompressor. Otherwise, the compressor may discard one or more of the buffered compressed UL packets, (e.g. some of the TCP ACK packets in the transmit buffer for the above example), and proceed with transmitting the next remaining (compressed) packet from the transmit buffer to the decompressor.

Exemplary Method for Compression State Synchronization

Figure 6:
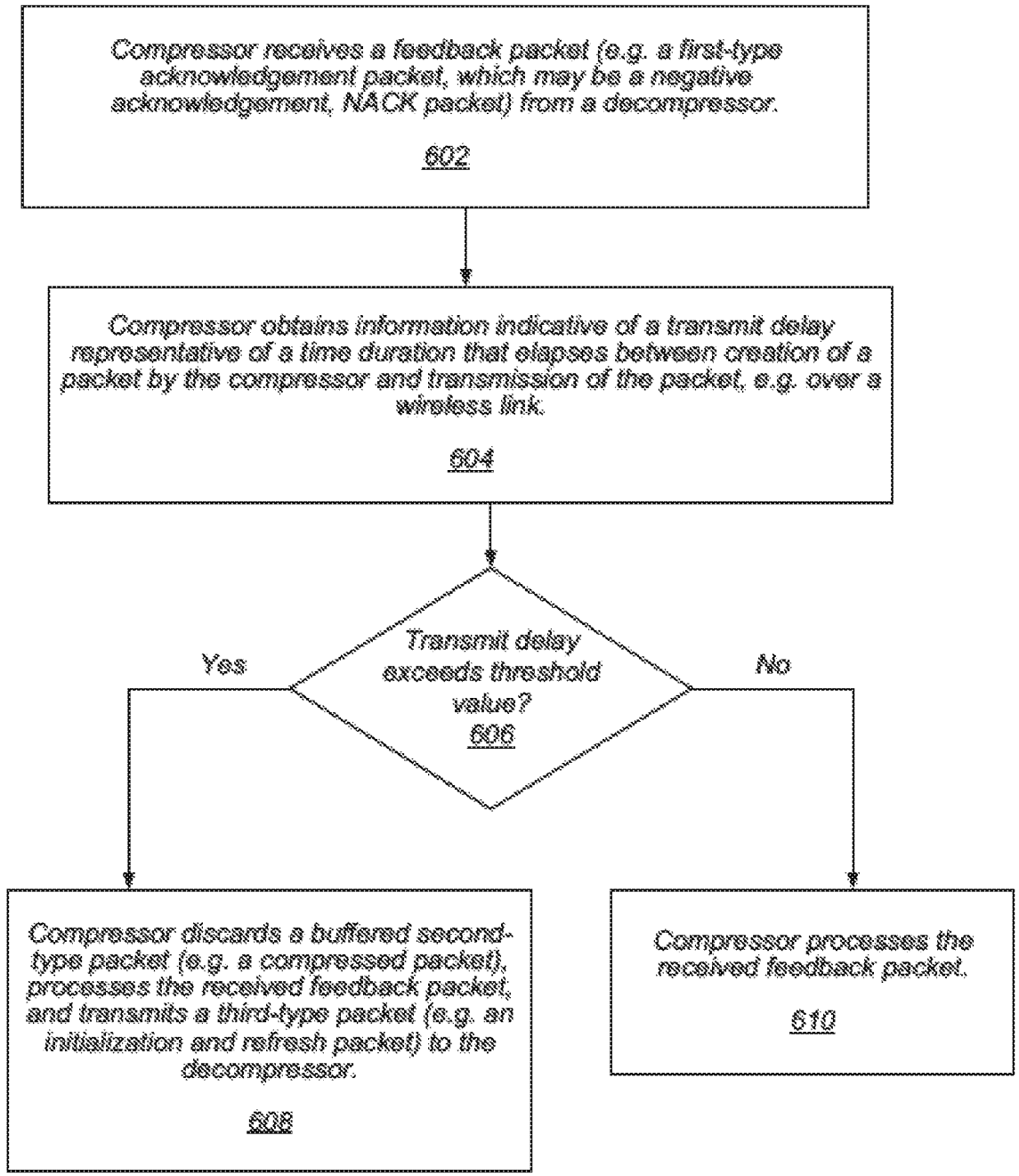
FIG. 6 shows a flow diagram illustrating an exemplary method for accurate synchronization of compressor state and decompressor state during wireless communications, according to some embodiments.

FIG. 6 shows an exemplary flow diagram illustrating how packet header compression with accurate synchronization of the compressor state and the decompressor state may be implemented, according to various embodiments. As shown in FIG. 6, a device, or specifically a compressor within the device may receive a feedback packet from a decompressor (602). The feedback packet may be a first-type acknowledgement packet or acknowledgement packet of a first type, e.g. a negative acknowledgement, NACK packet. The device (e.g. the compressor) may obtain information indicative of a transmit delay representative of a time duration that elapses between creation of a packet by the compressor and transmission of the packet, e.g. transmission of the packet over a wireless link (604). If the transmit delay exceeds a specified threshold value ("Yes" at 606), the device (e.g. the compressor) may discard a buffered second-type packet (or buffered packet of a second type, e.g. a compressed packet) and may transmit a third-type packet (or packet of a third type, e.g. an initialization and refresh packet) to the decompressor (608). That is, a second-type packet is of a different type than a third-type packet e.g. the second-type may correspond to a compressed packet and the third-type may correspond to an initialization and refresh and/or an initialization and refresh dynamic packet. The packet discarded by the compressor may be in the head of a transmit buffer. If the delay does not exceed the specified threshold value ("No" at 606), the device (e.g. the compressor) may process the received feedback packet (610).

Figure 7:
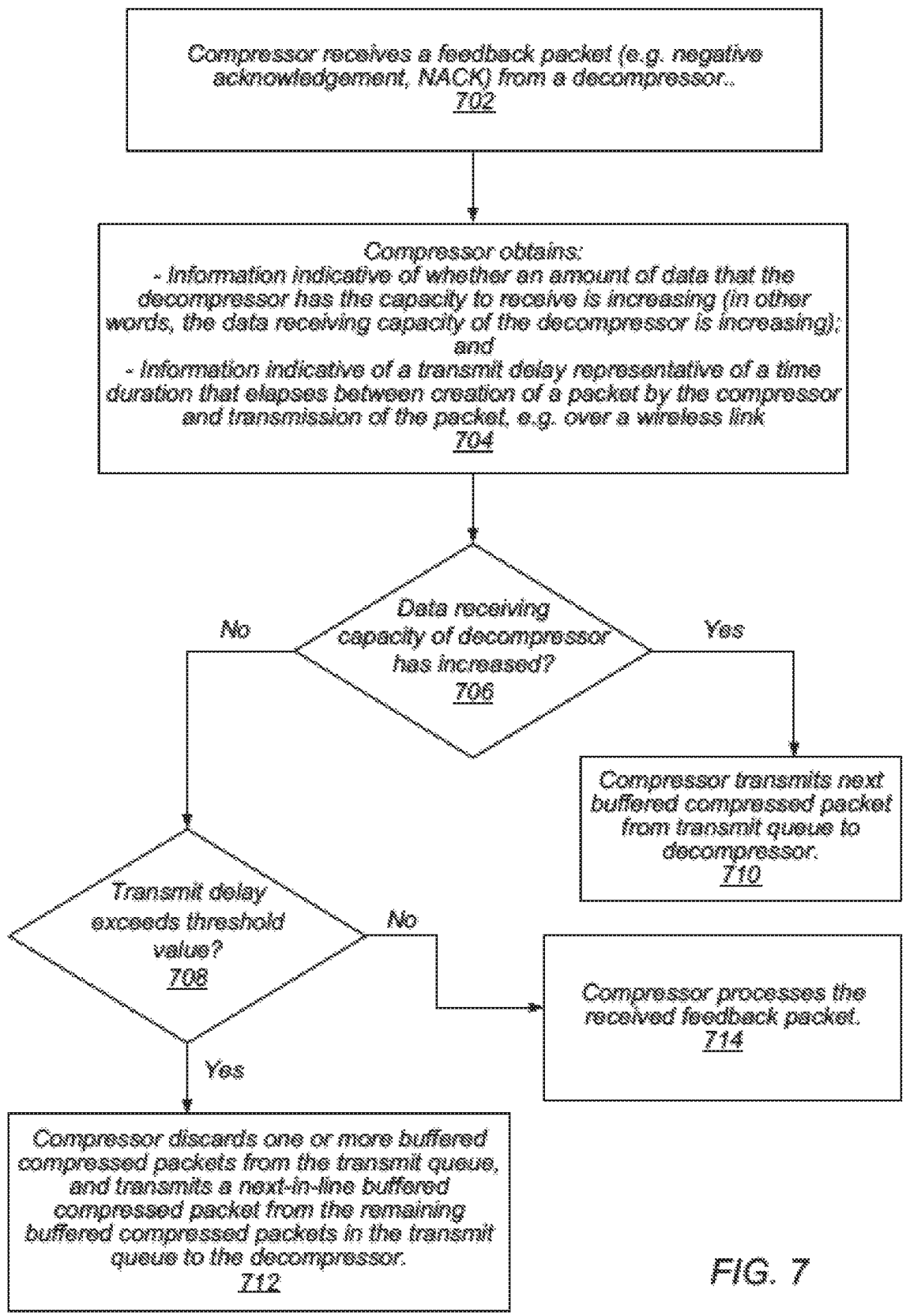
FIG. 7 shows a flow diagram illustrating an exemplary method for accurate synchronization of compressor state and decompressor state while balancing uplink and downlink performance during wireless communications, according to some embodiments.

Exemplary Method for Compression State Synchronization with UL/DL Performance Balancing FIG. 7 shows a flow diagram illustrating an exemplary method for accurate synchronization of compressor state and decompressor state while balancing uplink and downlink performance during wireless communications, according to some embodiments. As shown in FIG. 7, a compressor (e.g. a compressor within a UE) may receive a feedback packet from a decompressor (e.g. a decompressor in a base station/server) (702). The feedback packet may be a first-type acknowledgement packet or acknowledgement packet of a first type, e.g. a negative acknowledgement NACK packet. The compressor may obtain information indicative of whether an amount of data that the decompressor has the capacity to receive is increasing (in other words, the data receiving capacity of the decompressor is increasing), and may also obtain information indicative of a transmit delay representative of a time duration that elapses between creation of a packet by the compressor and transmission of the packet, e.g. transmission of the packet over a wireless link (704).

If the data receiving capacity of the decompressor has increased ("Yes" at 706), the compressor may transmit a next buffered compressed packet from the head of the transmit queue to the decompressor (710). If the data receiving capacity of the decompressor has not increased ("No" at 706), and the transmit delay exceeds a specified threshold value ("Yes" at 7081 the compressor may discard one or more buffered compressed packets from the transmit queue (e.g. from the head of the transmit queue), and may transmit a next-in-line buffered compressed packet from the remaining buffered compressed packets in the transmit queue (e.g., from the head of the transmit queue) to the decompressor (712). On the other hand, if the transmit delay does not exceed the specified threshold value ("No" at 708), the compressor may process the received feedback packet (714).

Embodiments of the present invention may be realized in any of various forms. For example, in same embodiments, the present invention may be realized as a computer-implemented method, a computer-readable memory medium, or a computer system. In other embodiments, the present invention may be realized using one or move custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it trues program instructions author data, where the program instructions, if executed by a computer system, cause the computer system to perform a method e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for synchronizing a compressor state and a decompressor state, the method comprising:
   in a compressor:
      receiving a feedback packet from a decompressor;
      obtaining first information indicative of a transmit delay representative of a time duration that elapses between creation of a packet and transmission of the packet;
      in response to the first information indicating that the transmit delay does not exceed a specified threshold value, processing the received feedback packet; and
      in response to the first information indicating that the transmit delay exceeds the specified threshold value;
         discarding a buffered packet of a first type that was scheduled to be transmitted next to the decompressor; and
         transmitting a packet of a second type to the decompressor instead of the discarded packet.

2. The method of claim 1, wherein the compressor is comprised in a mobile wireless communication device and wherein the decompressor is comprised in a cellular base station.

3. The method of claim 1, wherein the feedback packet comprises a robust header compression (ROHC) negative acknowledgement packet.

4. The method of claim 1, wherein the buffered packet of a first type comprises a robust header compression (ROHC) compressed packet.

5. The method of claim 1, wherein the packet of a second type comprises one of a robust header compression (ROHC) initialization and refresh (IR) packet or an ROHC IR dynamic packet.

6. The method of claim 1, further comprising:
   in the compressor:

obtaining second information indicative of an uplink capacity associated with a wireless communication device that comprises the compressor;
wherein obtaining the first information comprises obtaining the first information based at least on the second information.

7. The method of claim 6, further comprising:
in the compressor, obtaining;
third information indicative of a uplink throughput associated with the wireless communication device; and
fourth information indicative of an uplink power headroom associated with the wireless communication device;
wherein obtaining the second information comprises obtaining the second information based at least on the third information and the fourth information.

8. An apparatus comprising:
a processing element configured to cause a device to:
receive a feedback packet from a second device, wherein the feedback packet comprises feedback information indicative of a state of a decompressor comprised in the second device;
obtain first information indicative of a transmit delay representative of a time duration that elapses between creation of a packet and transmission of the packet;
in response to the first information indicating that the transmit delay does not exceed a specified threshold value, process the received feedback packet; and
in response to the first information indicating that the transmit delay exceeds the specified threshold value:
discard a buffered packet of a first type that was scheduled to be transmitted next to the second device; and
transmit a packet of a second type to the decompressor instead of the discarded packet.

9. The apparatus of claim 8, wherein the feedback packet comprises a robust header compression (ROHC) negative acknowledgement packet.

10. The apparatus of claim 8, wherein the buffered packet of a first type comprises a robust header compression (ROHC) compressed packet.

11. The apparatus of claim 8, wherein the packet of a second type comprises one of a robust header compression (ROHC) initialization and refresh (IR) packet or an ROHC IR dynamic packet.

12. The apparatus of claim 8, wherein the processing element is configured to further cause the device to:
obtaining second information indicative of an uplink capacity associated with the device; and
obtain the first information based at least on the second information.

13. The apparatus of claim 12, wherein the processing element is configured to further cause the device to:
obtain third information indicative of a uplink throughput associated with the device;
fourth information indicative of an uplink power headroom associated with the device; and
obtain the second information based at least on the third information and the fourth information.

14. The apparatus of claim 8, wherein the device is one of:
a mobile wireless communication device; or
a wireless communication server and/or base station.

15. A device comprising:
radio circuitry configured to facilitate wireless communications of the device; and
a processing element communicatively coupled to the radio circuitry and configured to cause the device to:
receive a feedback packet from a second device, wherein the feedback packet comprises feedback information indicative of a state of a decompressor comprised in the second device;
obtain first information indicative of a transmit delay representative of a time duration that elapses between creation of a packet and transmission of the packet;
in response to the first information indicating that the transmit delay does not exceed a specified threshold value, process the received feedback packet; and
in response to the first information indicating that the transmit delay exceeds the specified threshold value:
discard a buffered packet of a first type that was scheduled to be transmitted next to the second device; and
transmit a packet of a second type to the decompressor instead of the discarded packet.

16. The device of claim 15, wherein the feedback packet comprises a robust header compression (ROHC) negative acknowledgement packet.

17. The device of claim 15, wherein the buffered packet of a first type comprises a robust header compression (ROHC) compressed packet.

18. The device of claim 15, wherein the packet of a second type comprises one of a robust header compression (ROHC) initialization and refresh (IR) packet or an ROHC IR dynamic packet.

19. The device of claim 15, wherein the processing element is configured to further cause the device to:
obtaining second information indicative of an uplink capacity associated with the device; and
obtain the first information based at least on the second information.

20. The device of claim 19, wherein the processing element is configured to further cause the device to:
obtain third information indicative of a uplink throughput associated with the device;
fourth information indicative of an uplink power headroom associated with the device; and
obtain the second information based at least on the third information and the fourth information.

* * * * *